United States Patent
Eruchimovitch et al.

(10) Patent No.: US 8,639,184 B2
(45) Date of Patent: Jan. 28, 2014

(54) STATIC NODES POSITIONING IN A WIRELESS NETWORK

(75) Inventors: Baruch Eruchimovitch, Haifa (IL); Gilad Bornstein, Haifa (IL); Nir Strauss, Haifa (IL)

(73) Assignee: QUALCOMM Incorporated, San Diego, CA (US)

(*) Notice: Subject to any disclaimer, the term of this patent is extended or adjusted under 35 U.S.C. 154(b) by 807 days.

(21) Appl. No.: 12/604,625

(22) Filed: Oct. 23, 2009

(65) Prior Publication Data

US 2010/0273418 A1 Oct. 28, 2010

Related U.S. Application Data

(60) Provisional application No. 61/112,051, filed on Nov. 6, 2008.

(51) Int. Cl.
*H04B 5/00* (2006.01)
*H04M 11/04* (2006.01)

(52) U.S. Cl.
USPC ...... 455/41.1; 455/41.2; 455/41.3; 455/404.1; 455/404.2; 455/456.1; 455/456.3; 455/457

(58) Field of Classification Search
USPC ............... 455/41.1, 41.2, 41.3, 404.1, 404.2, 455/456.1, 456.3, 457
See application file for complete search history.

(56) References Cited

U.S. PATENT DOCUMENTS

| 6,745,038 | B2 * | 6/2004 | Callaway et al. | 455/456.1 |
| 7,123,925 | B2 * | 10/2006 | Robinson et al. | 455/456.1 |
| 7,369,524 | B2 * | 5/2008 | Taubenheim et al. | 370/328 |
| 7,519,372 | B2 | 4/2009 | MacDonald et al. | |
| 7,821,986 | B2 * | 10/2010 | Thomson et al. | 370/328 |
| 7,941,159 | B2 * | 5/2011 | Walley et al. | 455/456.1 |

(Continued)

FOREIGN PATENT DOCUMENTS

| CN | 1802872 A | 7/2006 |
| CN | 101014010 A | 8/2007 |

(Continued)

OTHER PUBLICATIONS

International Search Report & Written Opinion—US2009/062960—International Search Authority—European Patent Office—Jun. 2, 2010.

(Continued)

*Primary Examiner* — Wen Huang
(74) *Attorney, Agent, or Firm* — Shyam K. Parekh; Mary A. Fales

(57) ABSTRACT

Positions in a region serviced by a short range wireless network are established by defining a grid for the region. The grid is divided into a plurality of cells having a predetermined size. A plurality of static nodes can be placed in the cells. A network identifier that is associated with a standard protocol for the network is assigned to each of the static nodes. The identifier is assigned so as to identify the node and to represent a set of X, Y coordinates associated the cell where static node is located. The X,Y coordinate are assigned to the identifier without deviating from the standard protocol. The identifier is periodically broadcast from the static nodes. A cell of the grid within which a mobile node is located is estimated based on the identifier and an additional parameter received from one of the static nodes.

26 Claims, 7 Drawing Sheets

(56) References Cited

U.S. PATENT DOCUMENTS

| | | | |
|---|---|---|---|
| 7,962,138 B2* | 6/2011 | Bae et al. | 455/436 |
| 8,060,107 B2* | 11/2011 | Takizawa et al. | 455/456.1 |
| 8,112,073 B2* | 2/2012 | Schweiger et al. | 455/421 |
| 2004/0152471 A1 | 8/2004 | MacDonald et al. | |
| 2004/0214527 A1* | 10/2004 | Lim et al. | 455/41.2 |
| 2005/0136845 A1 | 6/2005 | Masuoka et al. | |
| 2006/0176865 A1 | 8/2006 | Cho | |
| 2007/0060098 A1 | 3/2007 | McCoy | |
| 2007/0060134 A1* | 3/2007 | Bhatti et al. | 455/445 |

FOREIGN PATENT DOCUMENTS

| | | | |
|---|---|---|---|
| CN | 101099346 A | 1/2008 | |
| CN | 101110735 A | 1/2008 | |
| CN | 101237467 A | 8/2008 | |
| CN | 101247414 A | 8/2008 | |
| CN | 101263700 A | 9/2008 | |
| EP | 1936889 A1 | 6/2008 | |
| JP | 10079972 A | 3/1998 | |
| JP | 2001349742 A | 12/2001 | |
| JP | 2005099018 A | 4/2005 | |
| JP | 2006222950 A | 8/2006 | |
| JP | 2006352810 A | 12/2006 | |
| WO | WO2007018296 A1 | 2/2007 | |

OTHER PUBLICATIONS

R. Grossmann, Jan Blumenthal, Frank Golatowksi, Dirk Timmermann: "Localization in Zigbee-based sensor networks" Nov. 15, 2007, XP002566622 Retrieved from the Internet: URL:http://www.loms-itea.org/publications/LocalizationZigbee.pdf> [retrieved on Feb. 3, 2010] Prior art doc: establish positions in zigbee networks,using beacons at know locations within a square grid; beacons transmit their know position and ID.

* cited by examiner

STATIC NODES POSITIONING IN A
WIRELESS NETWORK

CLAIM OF PRIORITY UNDER 35 U.S.C. §119

The present application claims priority to Provisional Application No. 61/112,051 entitled "STATIC NODE POSITIONING AND MOBILE ZED ZONE LOCATION IN ZIGBEE NETWORK" filed Nov. 6, 2008, is commonly owned by the assignee hereof and is and incorporated herein by reference.

BACKGROUND

1. Background Field

The present application is directed to location determination in short range wireless networks and more particularly to establishing static node positions in a short range wireless network using existing protocol mechanisms not related to location.

2. Relevant Background

With the ever-increasing demand for wireless solutions to common short and medium-distance connection problems, ad-hoc wireless networks under, for example, wireless personal area network (WPAN) standards, such as the IEEE 802.15.4-2003 standard, have been gaining popularity. Examples of such network standards include WiFi and Bluetooth®. However, there is room for expansion of capabilities in existing WPAN standards. For example, existing WPAN standards such as Bluetooth® have established wake up latencies in the order of seconds leading to relatively higher power consumption over time. New lower power standards have since emerged, such as the ZigBee standard. ZigBee is a standard for a communication protocol using small, low-power short range digital radios to facilitate connections between such devices as wireless headphones and cell phones. It should be noted that the term ZigBee is used throughout the document and, for convenience the trademark symbol is omitted, however ZigBee is a registered trademark belonging to the ZigBee Alliance. The technology defined by the ZigBee specification is intended to be simpler and less expensive and targeted at applications that require a low data rate, long battery life, and secure networking. Wake-up latencies under the ZigBee standard are on the order of milliseconds, leading to large power savings. However, the ZigBee standard is still emerging and does not define a mechanism for positioning of nodes.

It is well appreciated that positioning information can be important. For example in the case of an alarm or failure notification from a static node associated with critical equipment, positioning information is crucial for dispatching repair or other appropriate services. Further, the positioning of mobile nodes within a network, such as within certain zones, can become important for security purposes and other related purposes such as tracking the movement of mobile nodes within the area served by the network.

In accordance with the conventional art, the static node positioning issue is currently resolved at the application layer through the use of proprietary messages and applications. Thus, mobile nodes configured for operation in accordance with the standard protocol can not conform to the proprietary location services without the proprietary application. Further, in such proprietary networks, zone tracking is accomplished using excessive amounts of overhead. In some tracking and security applications, the behavior of an object under control depends on the zone location. For example, when a child, who is being tracked through the use of a short-range wireless device, enters a school region during a school day a safe state is assigned to the child based on the detected location as being within the school region. When the child leaves the school region during a school day an unsafe or alarm state can be generated. In order to accomplish such tracking, in accordance with conventional techniques, a zone under control, such as a school, may be bounded by an RF fence made up of a number of static nodes deployed along the physical boundaries of the desired fence. The static nodes can be set in internal spaces such as classrooms so that the whole zone is covered by one or more bounded networks using special applications such as home control, energy saving, or the like. The special applications can run on zone controllers or zone routers and listen to activity of any ZED that are currently in the network and pass collected information such as RSSIs to ZC where the MZED location is calculated upon the supplied information. The above described method requires proprietary applications on the static nodes and wastes limited ZigBee RF resources.

It would be desirable in the art to use existing protocol mechanisms for generating positioning information. Such an approach would avoid excessive consumption of wireless resources, both on the static nodes and on zone controllers and routers.

SUMMARY

Exemplary embodiments are directed to systems and method for establishing positions for static nodes, in a region serviced by a short range wireless network. In accordance with an embodiment, a grid is defined for the region. The grid can be divided into a plurality of cells having a predetermined size. A plurality of static nodes associated with the short-range wireless network is capable of being placed within ones of the plurality of cells in order, for example, to establish ascertainable positions for the static nodes. A network identifier is assigned to each one of the plurality of static nodes when placed within the ones of the plurality of cells. The network identifier is associated with a standard protocol for the short range wireless network. For example, in accordance with 802.15.4 standards defining a ZigBee network, the network identifier can be the two byte "shortID" specified therein. It should be noted that in accordance with existing ZigBee standards, there is no positioning procedure specified in the standard. Thus, in accordance with various exemplary embodiments, the network identifier is assigned so as to identify the node and also to represent a set of X, Y coordinates associated with a first one of the plurality of cells where the static node is located without deviating from the standard protocol such as an 802.15.4 network protocol. In the ZigBee example, the two byte shortID functions to identify the static node and to provide X and Y coordinates of the cell within which the static node is located.

In accordance with an embodiment, the network identifier is periodically broadcast from respective ones of the plurality of static nodes. The one of the plurality of cells of the grid within which a mobile node is located can then be estimated based on the respective network identifier and an additional parameter received from ones of the plurality of static nodes, such as a received signal strength indication (RSSI) associated with a signal received by the mobile node. The mobile node can, for example, compare the RSSIs received from various ones of the static nodes and estimate which of the static nodes it is closest to and then, based on the X, Y coordinates and knowledge of the cell size and parameters such as the RSSI per meter, estimate its location within one of the cells of the grid. The respective network identifier and the additional parameter can be received at the mobile station from at least one of the plurality of static nodes, whereupon a local decision can be made at the mobile station, with regard to the position of the mobile station relative to the first one of the cells based on the network identifier and the additional parameter. Information about the plurality of static nodes can be collected at a concentrator node based on the respective network identifier associated with each of the plurality of nodes. The collected information can be transferred from the concentrator node to a destination via a public network connection such as an internet connection. It should be noted that the information is collected and transferred across an application layer associated with the standard protocol.

In accordance with an embodiment, a static node is provided for establishing positions in a region serviced by a short range wireless network. The static node can include a transceiver for transmitting and receiving communications according to a standard protocol for the short range wireless network such as an 802.15.4 protocol. A processor coupled to the transceiver can be configured to include a network identifier identifying the static node in accordance with the standard protocol when transmitting the communication. The network identifier represents a set of X, Y coordinates associated with a respective one of a plurality of cells of a grid into which the region is divided and in which the static node is located. The X, Y coordinates are provided without deviating from the standard protocol. Each of the plurality of cells has a size defined in units, such as meters such that, for example, position estimates can easily be made. The network identifier can then be periodically broadcast by the transceiver to receiving nodes.

It should be noted that the transceiver is coupled to the receiving nodes through an air interface. When the network identifier is periodically broadcast, the receiving nodes receive the network identifier and estimate a one of the plurality of cells of the grid within which respective ones thereof are located based on the network identifier and additional parameter received from the static node such as a received signal strength indication (RSSI) associated with the respective ones of the receiving nodes. Further in accordance with an embodiment, the transceiver is coupled to a concentrator node, which, in turn, is coupled to a public network, such as the internet. When the network identifier is periodically broadcast, the concentrator node collects information about the position of the static node based on the network identifier and transfers transferring the collected information from the concentrator node to a destination via the public network. Accordingly, when the information includes, for example, alarm information associated with the static node or the receiving nodes, the information can be collected and transferred via the public network using an application layer.

In accordance with an embodiment, a mobile node can be provided that is capable of establishing a zone position in a region serviced by a short range wireless network. The mobile node can include a transceiver for transmitting and receiving communications according to a standard protocol for the short range wireless network, such as an 80-2.15.4 protocol. A processor coupled to the transceiver can be configured to receive a network identifier from the transceiver in accordance with the standard protocol from at least one of a plurality of static nodes within the short range wireless network. The network identifier identifies the at least one of the plurality of static nodes.

In accordance with an embodiment, a computer program product is provided for establishing positions in a region serviced by a short range wireless network. The computer program product can comprise a computer readable medium, such as a storage medium or the like, and instructions carried on the medium, which, when read and executed by a processor in one of the plurality of static nodes, can cause the static node to periodically broadcast a positioning communication including the network identifier as described herein.

In accordance with an embodiment, an apparatus can be provided for establishing positions in a region serviced by a short range wireless network. The exemplary apparatus can include means, the structural support for which will be described in greater detail herein below, for periodically broadcasting the network identifier. Means for estimating a one of the plurality of cells of the grid within which a mobile node is located based on the received network identifier and an additional parameter, such as a received signal strength indication (RSSI) associated with the mobile node, received with the network identifier is also provided. It should be noted that support for means disclosed herein will be provided herein below along with a correspondence between the means and structure in support thereof. The apparatus can further include means for receiving the network identifier and the additional parameter and deciding locally the position the one of the plurality of cells based on the network identifier and the additional parameter. Means for collecting information about the plurality of static nodes can also be provided, and the information can be collected based on the network identifier, and transferring the collected information to a destination via an internet connection. It should be noted that the information can be collected and transferred across an application layer associated with a protocol for the short range wireless network such as an 802.15.4 protocol.

BRIEF DESCRIPTION OF THE DRAWINGS

The accompanying drawings are presented to aid in the description of embodiments and are provided solely for illustration of the embodiments and not limitation thereof.

DETAILED DESCRIPTION

Figure 1:
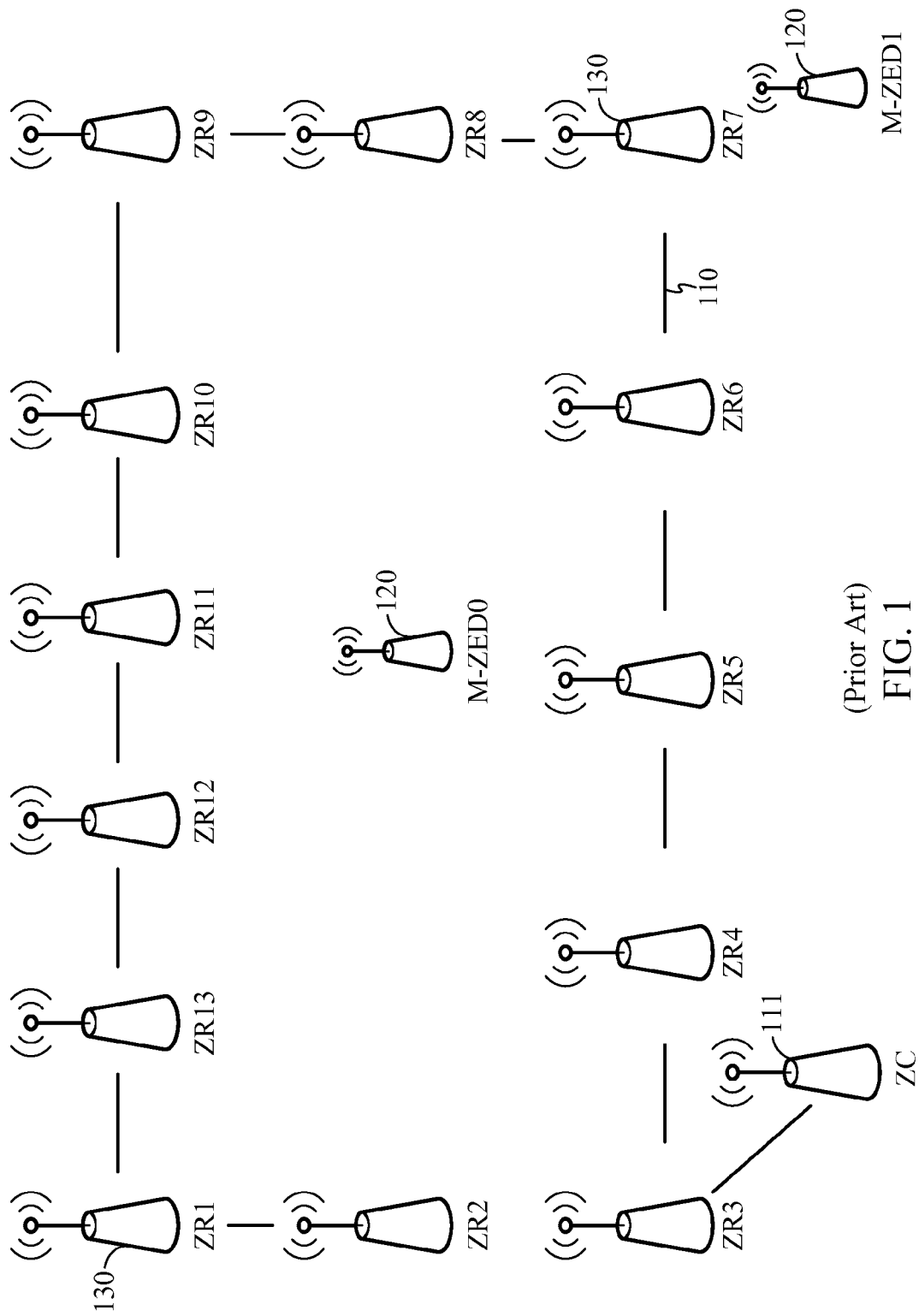
FIG. 1 is a diagram illustrating a conventional positioning scenario using an RF "fence."

Aspects are disclosed in the following description and related drawings directed to specific embodiments. Alternate embodiments may be devised without departing from the scope. Additionally, well-known elements will not be described in detail or will be omitted so as not to obscure the relevant details.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

For illustrative purposes, the following acronyms as used herein can be defined as follows: ZED—ZigBee End Device;

MZED—Mobile ZED; ZC—ZigBee Concentrator; ZR—ZigBee Router; ZNet—ZigBee Network; and RSSI—Received Signal Strength Indication.

It will be appreciated that various exemplary embodiments can use the existing network structure in a ZigBee network to perform static node positioning and mobile ZED zone location. The present disclosure uses a ZigBee network as one example, however it will be appreciated that the techniques described herein can be applied to other wireless networks including a variety of short range wireless networks. While existing methods rely on proprietary messages and/or maintaining databases to perform static node positioning and on proprietary applications on the static nodes to calculate MZED location, the present disclosure involves a novel approach using existing protocol mechanisms for position location without incurring the overhead generated by existing methods. Implementation of such an approach would be fully backward compatible with existing specifications and would require no change to existing standards.

The embodiments described herein can be implemented by various means depending upon the application. For example, embodiments can be implemented in hardware, firmware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. As used herein, the term "control logic" encompasses logic implemented by software, hardware, firmware, or a combination. For a firmware and/or software implementation, embodiments can be implemented with modules such as procedures, functions, and so on, that perform the functions described herein. Any machine readable medium tangibly embodying instructions can be used in implementing the embodiments described herein.

For example, software codes can be stored in a memory such as, for example, the memory of a ZC or ZR, and executed by a processing unit. Memory can be implemented within the processor or external to the processor. As used herein the term "memory" refers to any type of long term, short term, volatile, nonvolatile, or other storage devices and is not to be limited to any particular type of memory or number of memories, or type of media upon which memory is stored.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits such as application specific integrated circuits (ASICs), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

It should be noted that while the present disclosure is drawn for illustrative purposes to a ZigBee network, the embodiments described herein can be applicable in any short range wireless network or other wireless network. Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

By way of brief summary, using a ZigBee network as an example, in accordance with various embodiments, a ZigBee operator/administrator can define a desired region for the exemplary ZigBee network which will be referred to herein as a ZIsland. A Z-Net subset can be defined in which a specific ZigBee based service can be supplied. A minimum rectangle can be defined, which is a dimensioned rectangle having a minimum area enclosing Z-Island. A grid can be defined that is applied to the rectangle, the grid divided into cells and having a zero-point at a top-left corner of the minimum rectangle. A size of the grid cell can be defined, for example, in a measurement unit such as meters. For each static node such as a ZigBee Router (ZR), ZigBee End Device (ZED), or the like, a node address can be defined that includes a shortID, and 2 bytes. The shortID can be configured, for example, to contain coordinates of grid cell in which the node is located, such as coordinates that define the upper left corner of the grid cell in normalized units. While a more precise geographical position of the node within the cell can useful, it is optional in accordance with embodiments. Remaining node addresses can be assigned by the coordinator (ZC) to dynamic, mobile ZEDs directly or via ZRs. Any message from the static node accordingly can carry position information for the node in the shortID thereof, without any additional overhead such as additional messaging, or the need for management systems, databases or the like.

It should be noted that in some ZigBee based tracking/security applications, there can be a requirement to calculate an MZED zone location or position, relative to a number of static Z-Net nodes such as ZigBee Concentrator (ZC) nodes and ZigBee router (ZR) nodes. According to a conventional method, special applications, running on a ZC or a ZR, listen to ZigBee activity of any ZED currently joint to the Z-Net. Collected information, such as RSSIs for monitored nodes, is passed to the ZC whereupon the MZED location is calculated based upon the supplied information. The conventional method requires the presence of proprietary applications on the static nodes and wastes limited ZigBee RF resources. In accordance with various embodiments such proprietary applications dedicated to location calculation are avoided.

Since the shortID of the static node contains the node position, the MZED can determine its zone as follows. The MZED obtains the Z-Net grid information from ZC. The static nodes, which are mainly ZRs, can constantly emit Z-Net messages, the MZED can listen to the messages from the static nodes for a minimum amount of time required for collection of physical layer information such as RSSI from the nodes. Based upon the collected information, the MZED can decide about its zone location.

It will be appreciated that by requiring that MZEDs only engage in the zone location process, channel usage can be improved and additional notifications and information that would normally be provided by the ZC or Gateway is not required. Further, the static nodes play a passive role and thus nor extensions or changes to the existing ZR is required. It will be appreciated that the term "layer" or "layers" as used herein in connection with, for example, physical (PHY) layer, media access control (MAC) layer or application layer or the like, refers to various well understood protocol layers of the Open Systems Interconnect (OSI) model that is used in all packet communication systems that purport to be open-system compliant, *see e.g. Information Technology, Open Systems Interconnection, Basic Reference Model—The Basic Model*, International Organization for Standards (ISO), Standard No. ISO/IEC 7498-1:1994.

With reference to the accompanying drawings, a conventional short range network, such as a ZigBee network, can be provided to accomplish zone control as shown in FIG. 1. While the present example will be discussed in the context of a ZigBee network, various exemplary embodiments can be implemented in virtually any short range wireless network configuration where positioning is desired with the support of the standard protocol only. An exemplary region 100 such as a shopping mall, a schoolyard, or the like can be covered with an RF fence 110 that is made up of a series of fixed nodes such as ZigBee Routers (ZRs) 130. Alternatively, the fence can include ZigBee end devices (ZEDs) or a combination of different types of nodes. It will be noted that the fence generally would not be made up of higher level nodes such as ZigBee concentrators, although, for illustration a single ZC 111 has been included in the present example to support various positioning applications as will be described.

When a mobile ZigBee end device (M_ZED) 120, such as M_ZED0, is operating within the RF fence 110, the various static nodes can confirm such operation using metrics such as RSSI of the received signal from the M_ZED 120 relative to ones of the ZRs 130. Likewise, when an M_ZED 120, such as M_ZED1, is operating "outside" the RF fence 110, such a location can be confirmed through measurements. Since there is no relative position reference however, the exact location of the mobile device M_ZED 120 or even the nodes along the RF fence 110 cannot be known easily.

Figure 2:
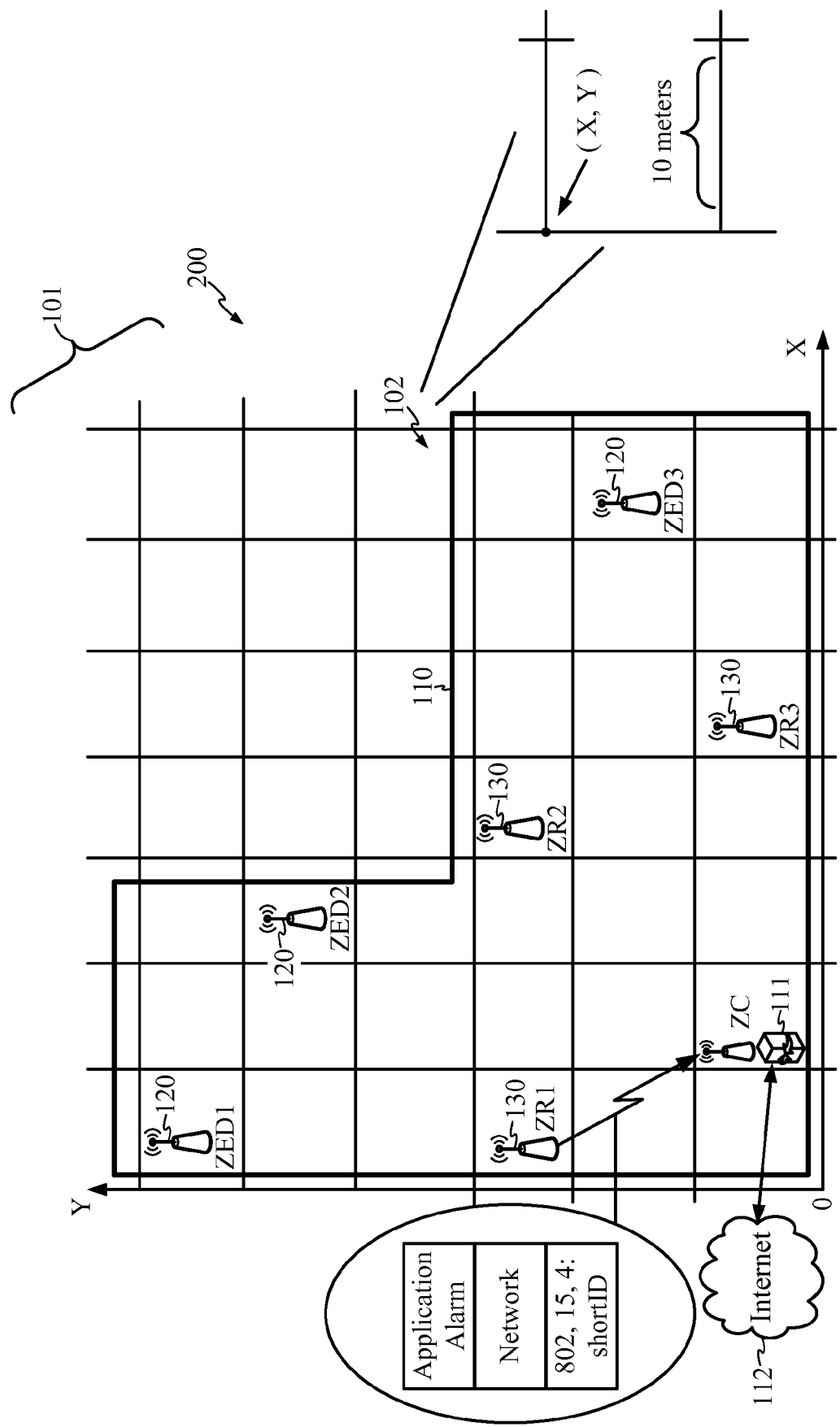
FIG. 2 is a diagram illustrating an exemplary positioning grid established.

To address the above and other situations, an arrangement that facilitates the determination of the position of the static nodes is shown in FIG. 2. Region 200 can be an area in a shopping mall, a school yard, an equipment installation, or the like. The region 200, can be divided into a more specific area with a boundary such as boundary 110 and various nodes can be present such as ZEDs 120 and ZRs 130. A ZC 111 can be present to perform various control functions and facilitate communication between the various nodes within the boundary 110 and communication outside the boundary 110 such as communication to and from a public network such as internet 112.

Superimposed on the region 200 and the boundary 110 can be a grid 101 that is divided into cells 102 having a predetermined size in units such as meters. The cells can be positioned according to a reference point such as, for example, the X, Y coordinate associated with the upper left hand corner thereof. The static node can be placed inside one of the cells and is assigned an identifier in accordance with the relevant standard protocol. It will be appreciated that the identifier can be assigned, for example, by a controller node, such as ZC 111, when identifiers have been sent to the static nodes, additional identifiers can be assigned to mobile nodes. Since the ZC 111 assigns the identifiers, knowledge of the type of node will prevent the mislocating of a mobile node based on its identifier, which may or may not accurately reflect the location of the node.

While the identifier will comply with the identification requirements of the relevant protocol, the identifier will be configured and assigned to the static node in such a manner as to provide an X, Y coordinate that identifies the cell within which the static node is placed. In the ZigBee example, as described hereinabove, for example, the shortID is a 2 byte identifier, which can be configured such that one byte of the identifier represents an X coordinate and one byte represents a Y coordinate of the cell. An identifier from any short range wireless protocol, referred to hereinafter as a "network identifier" can be similarly adapted. It should also be understood that while in the ZigBee example a two byte identifier can be used, additional bytes can be used in accordance with other protocols or embodiments to cover, for example, a greater number of grids, or to provide a greater resolution, or the like.

In an alternative exemplary embodiment, global positioning system (GPS) coordinates, while not necessary, can be usefully incorporated into the cell coordinate information associated with the static node. It will be appreciated that by knowing a location of a static node relative to grid 101, within one of the cells 102, the general position of the static node can be known, which is convenient for purposes of alarm servicing, zone monitoring, and the like. For example, if static node ZR1 130 experiences an alarm, the information can be collected by ZC 111 and a message can be conveyed to a public network such as the internet 112 in order to log information, dispatch service, generate a response, or the like. Still further, by knowing the division of cell size, and knowing a distance based parameter such as RSSI that is associated with a signal transmitted from a static node, a relative position of a mobile node within a cell or a zone can be estimated as will be described hereinafter.

Figure 3:
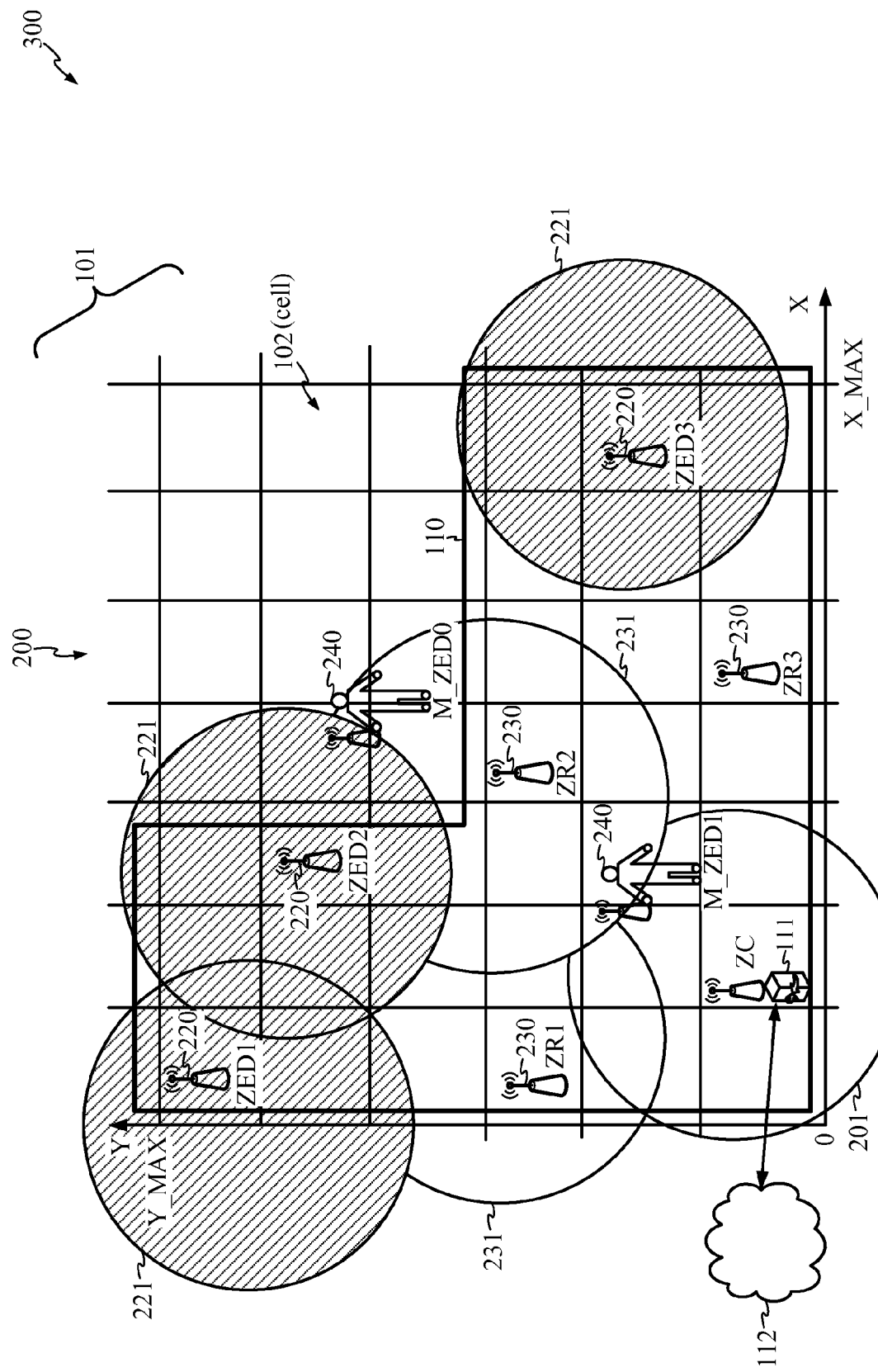
FIG. 3 is a diagram illustrating grid based position incorporating exemplary zones.

Mobile node tracking in terms of a zone location is illustrated in exemplary scenario 300 shown in FIG. 3. To track the position of a mobile node, such as M_ZED1 240 and M_ZED0 240, the positions of static nodes such as ZED1 220-ZED3 220 and ZR1 230-ZR3 230 can be established with reference to grid 101 and cells 102 as described above.

Once the positions of the static nodes are established and the static nodes begin to transmit using the identifier having the X, Y coordinates of the respective cells within which the static nodes are located, the position of mobile nodes M_ZED1 240 and M_ZED0 240 can be tracked as they travel within region 200, both inside and outside boundary 110. Each of the static nodes such as ZED1 220-ZED3 220 and ZR1 230-ZR3 230 can have respective transmission ranges 221 and 231 and, for ZC 111, a transmission range 201, that may span several cells. However, since the X, Y coordinates of the cell and the cell size is known, and since a measurement such as a received signal strength indicator (RSSI) can be calibrated in terms of distance, the position of the mobile nodes M_ZED1 240 and M_ZED0 240 can be estimated based on communications from one or more nodes. It will be appreciated that the more nodes that are used for measurements, the more accurate the location estimate will be. It will also be appreciated that while nodes, such as ZED1 200-ZED3 220 and ZR1 230-ZR3 230 can transmit identifiers having X, Y coordinates of respective cells, a controller node, such as ZC 111 can also transmit an identifier having X, Y coordinates.

Once the position of the mobile nodes is estimated, additional information can be collected and forwarded via ZC 111 and a connection to a public network such as internet 112 as described herein above. For example, if the location of M_ZED0 240, being outside region 110, represents an alarm condition, the location of M_ZED0 240 can be relayed to an entity such as an appropriate authority or monitoring node or facility such as through ZC 111 and a connection to a public network such as internet 112, through a mechanism such as through an exchange using an application layer.

Figure 4:
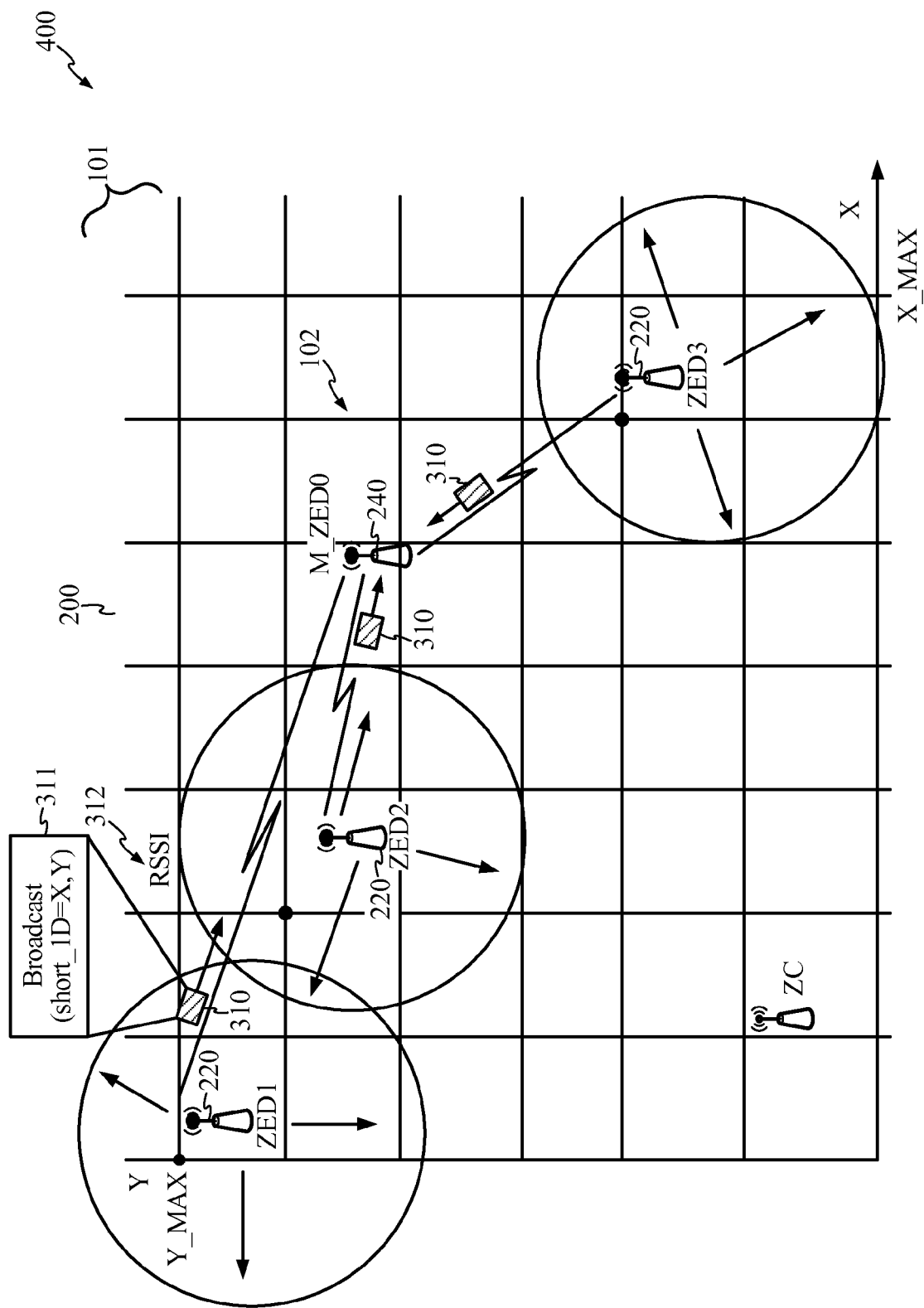
FIG. 4 is a diagram further illustrating exemplary grid based positioning.

To appreciate the manner in which the position of a mobile node is estimated, reference is made to FIG. 4. Assume that a mobile node such as M_ZED0 240 is located within region 200 and receives broadcast packets 310 from static nodes ZED1 230-ZED3 230. The broadcast packets 310 can be transmitted periodically from static nodes with information such as coordinates 311 and received in accordance with a parameter 312. In the present example, the coordinates 311 can be included in the shortID, which in addition to identifying the static node, represents the X, Y coordinates of the upper left corner of the cell 102 within which the static node is located. The parameter 312, in the present example, includes the RSSI, for example of the signal received by M_ZED0 240 from the respective static nodes. M_ZED0 240 can estimate its relative location within the grid using, for example, linear interpolation or the like, based on the RSSI parameter as the parameter 312 of the received broadcast packet 310 and the coordinates 311 associated with respective static nodes. It should be noted that since RSSI can be established as a function of distance for transmitters in a short range wireless network in accordance with established procedures, the estimation of location is thereby facilitated.

Figure 5:
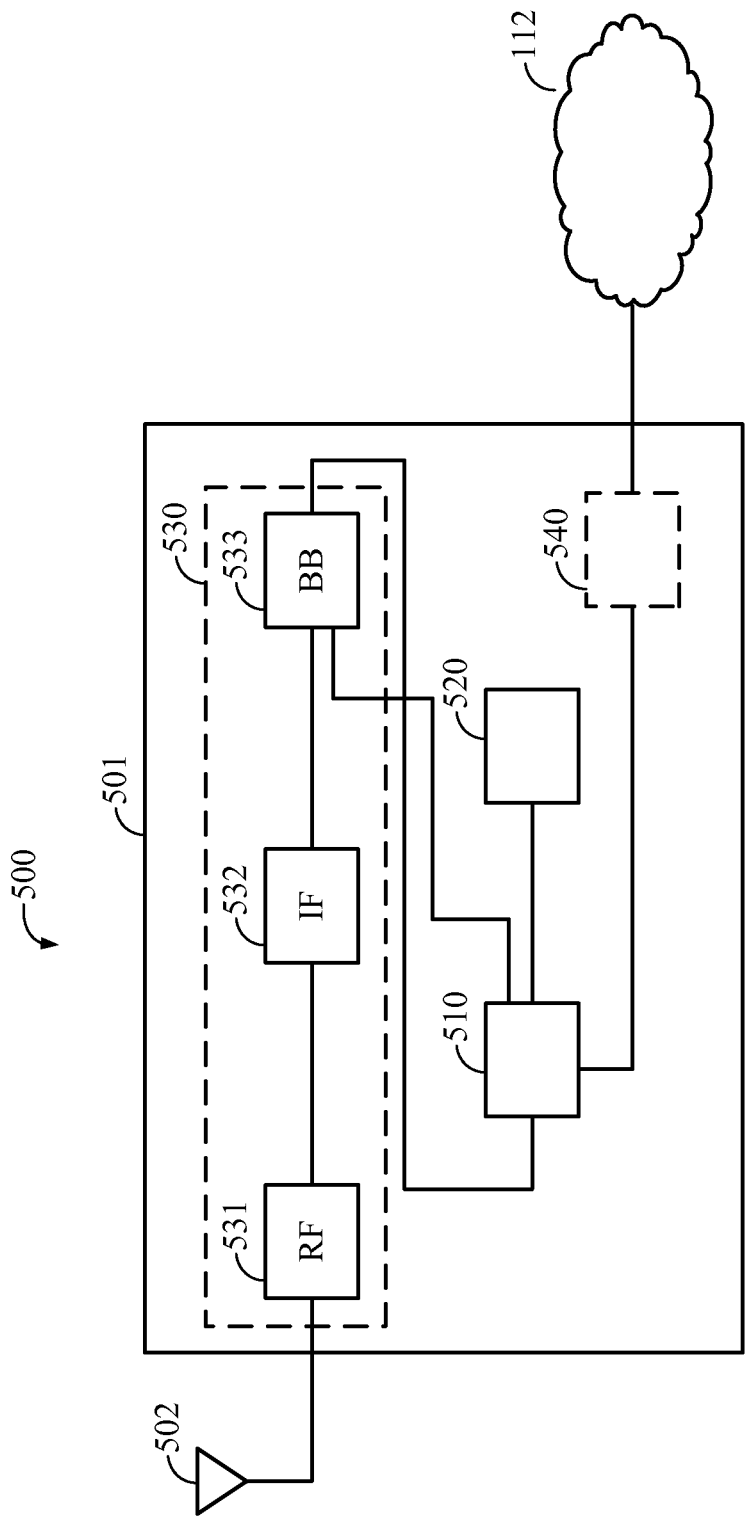
FIG. 5 is a block diagram illustrating an exemplary node.

It will be appreciated to those of skill in the art that embodiments discussed and described herein can be practiced on a variety of platforms provided the standard protocol for the relevant short range wireless network is followed. In an embodiment, an exemplary node can be configured as shown in FIG. 5. In scenario 500, a node device 501, which can be used to form a static node, a mobile node, or a special purpose node or the like can include features such as an antenna 502, a processor 510 a memory 520, a signal interface section 530 including an RF section 531, an intermediate frequency section 532 and a base band section 533. Since the exact parameters of the various sections of, for example, the signal interface section 530 depend heavily on factors such as the transmission frequency specified by the standard protocol under which the wireless network is operating under, the details of signal interface section 530 will be omitted for simplicity. Further, the node device 501 can be configured with an interface unit 540 that can provide the necessary interconnection hardware and the like, to connect with a public network such as internet 112. It will be understood however that the sections of node device 501, and in some cases, the sections operating with appropriate instructions as will be more thoroughly described below, can correspond to the various means that are referred to herein.

Figure 6:
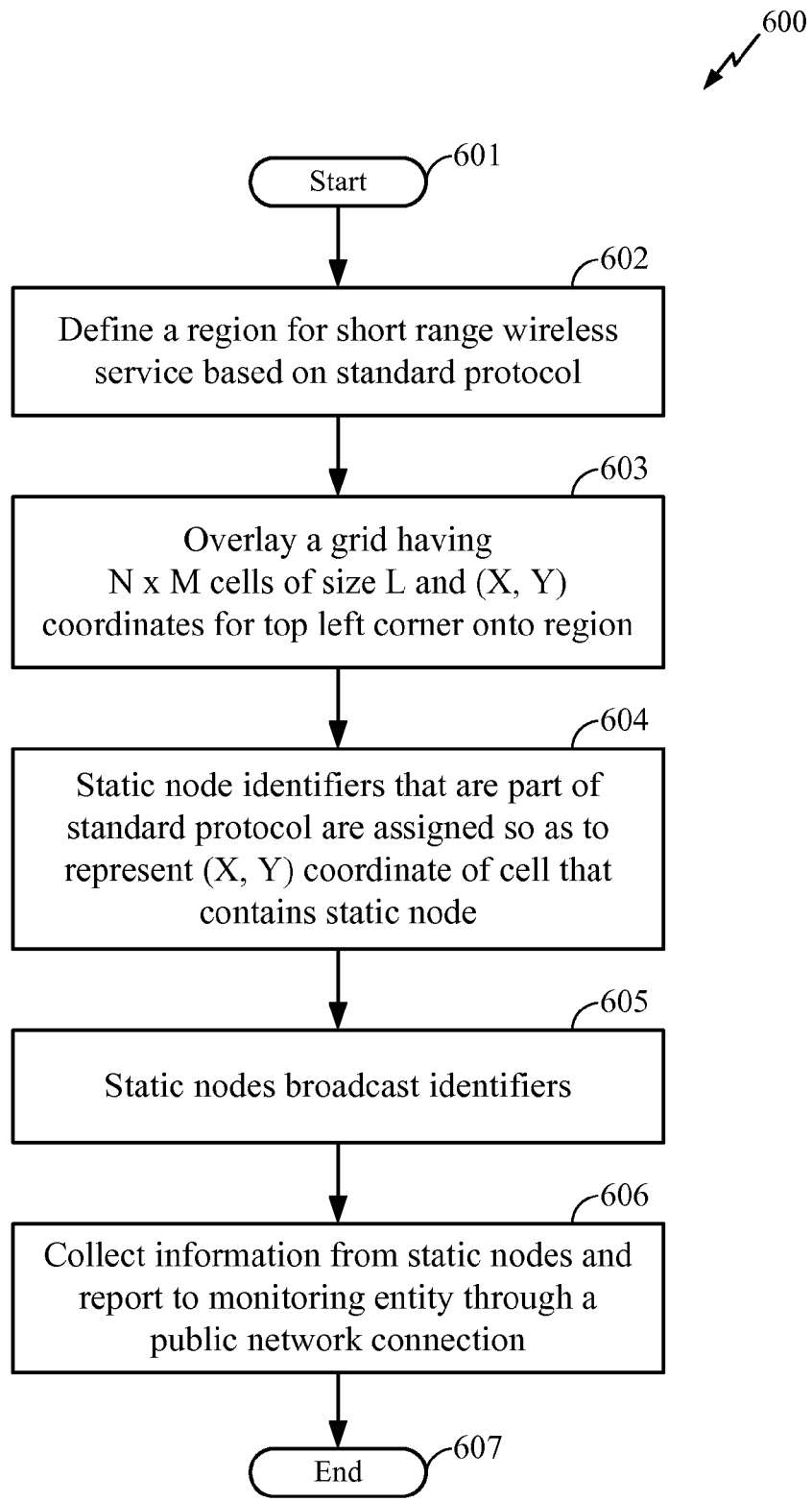
FIG. 6 is a flow chart illustrating exemplary static node positioning.

The hardware specified in FIG. 5 can be configured to operate in connection with the detailed procedures and algorithms described herein to accomplish positioning in accordance with various exemplary embodiments. For example, as shown in FIG. 6, after start at 601, a region can be defined, such as region 200, in which short range wireless communications can be conducted based on a standard wireless protocol at 602. After the region is defined, a grid, such as grid 101, can be overlaid or superimposed on the region 200, or more specifically, through a representation thereof, and divided into an array of N×M cells, each having a size L delineated in units such as meters or the like and each cell can be defined in terms of the X, Y coordinates for its upper left hand corner and the cell size at 603. The static node identifier that is part of the standard protocol can be adapted and assigned so as to represent the X, Y coordinate of the upper left hand corner of the cell within which the static node is located at 604. Once the network identifier of the static node is assigned, it can be broadcast at 605. It will be appreciated that the network identifier can be transmitted or broadcast periodically. The frequency of the broadcast would depend on the accuracy desired for the location services and other factors such as the available overhead in the network and the available capacity of the node to transmit and the like. In an embodiment, the network identifier and possibly other information can be collected at a node such as ZC 111 and transmitted to a reporting authority or the like at 606. While the process is indicated as ending at 607, it will be appreciated that such processing can continue on in an open loop fashion, particularly given that the information contained in the broadcast must be repeated indefinitely in order to support, for example, location of mobile nodes as will be described hereinafter.

Figure 7:
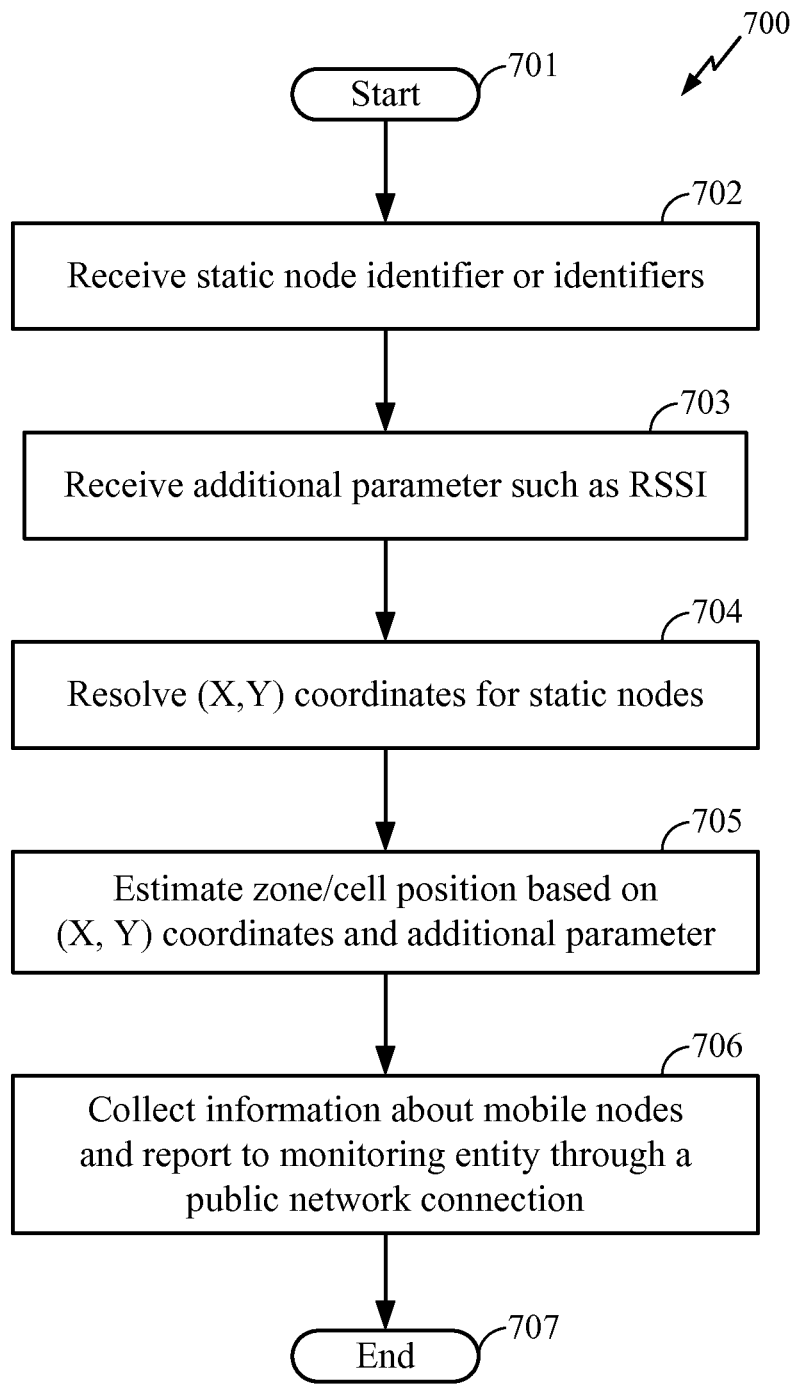
FIG. 7 is a flow chart illustrating exemplary mobile node positioning.

Zone location for mobile nodes can be accomplished by exemplary processing as illustrated in FIG. 7 in connection with static node positioning previous defined. After start at 701, packets that are broadcast from static nodes and include X, Y coordinates of the can be received by an exemplary mobile node at 702. The node identifier can be received with a signal level according to a received signal strength indication (RSSI) or additional parameters can be received at 703. The X, Y coordinates can be used to resolve the cell in which the static node is positioned at 704. When the cell or cells within which the static node or nodes are positioned is resolved, the RSSI and the coordinates can be used to estimate the location of the mobile nodes 705. It will be appreciated that deterministic methods such as a linear calculations can easily be used to deduce the cell within which the mobile is located, particularly where coordinates are received from multiple static nodes. However, in accordance with the embodiments described herein, an estimate can be made with information from a single static node, particularly if the previous zone position is known. It should be appreciated that in some instances, information about the location and movement of the mobile node can be collected and reported to various repositories, authorities, or agencies through an internet connection at 706. For example, in an exemplary ZigBee scenario, ZC 111 can collect and transfer information through an internet connection 112 in order to accomplish error reporting and the like.

Those of skill in the art will appreciate that, as described herein, information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment can include an article of manufacture, computer program product or the like including a computer readable media having instructions that when read cause a computer or a processor to perform certain functions associated with static node positioning and zone determination as discussed and described herein. Accordingly, the invention is not limited to illustrated examples and any means for performing the functionality described herein are included in embodiments.

While the foregoing disclosure shows illustrative embodiments, it should be noted that various changes and modifications could be made herein without departing from the scope as defined by the appended claims. The functions, steps and/or actions of the method claims in accordance with the embodiments described herein need not be performed in any particular order. Furthermore, although elements may be described or claimed in the singular, the plural is contemplated unless limitation to the singular is explicitly stated.

What is claimed is:

1. A method for establishing positions in a region serviced by a short range wireless network, the method comprising:
    defining a grid for the region, the grid divided into a plurality of cells having a predetermined size, a plurality of static nodes associated with the short range wireless network capable of being placed within ones of the plurality of cells; and
    assigning a network identifier to each one of the plurality of static nodes when placed within the ones of the plurality of cells, the network identifier associated with a standard protocol for the short range wireless network, the network identifier assigned so as to identify and to represent a set of X, Y coordinates associated with a first one of the plurality of cells where the one of the plurality of static nodes is located without deviating from the standard protocol, wherein the assigned network identifier is included in a message transmitted in accordance with the standard protocol.

2. The method according to claim 1, further comprising:
    periodically broadcasting the network identifier from respective ones of the plurality of static nodes; and
    estimating a second one of the plurality of cells of the grid within which a mobile node is located based on the respective network identifier and an additional parameter received from ones of the plurality of static nodes.

3. The method according to claim 2, wherein the additional parameter includes a received signal strength indication (RSSI).

4. The method according to claim 2, further comprising:
    receiving the respective network identifier and the additional parameter at the mobile node from at least one of the plurality of static nodes; and
    deciding locally at the mobile node, the position of the mobile node relative to the first one of the plurality of cells based on the network identifier and the additional parameter.

5. The method according to claim 1, wherein standard protocol for the short range wireless network includes an 802.15.4 network protocol.

6. The method according to claim 1, further comprising:
    collecting information about the plurality of static nodes at a concentrator node, the information collected based on the respective network identifier associated with each of the plurality of nodes; and
    transferring the collected information from the concentrator node to a destination via an internet connection.

7. The method according to claim 6, wherein the information is collected and transferred across an application layer associated with the standard protocol.

8. A static node for establishing positions in a region serviced by a short range wireless network, the static node comprising:
    a transceiver for transmitting and receiving communications according to a standard protocol for the short range wireless network; and
    a processor coupled to the transceiver, the processor configured to include a network identifier identifying the static node in accordance with the standard protocol when transmitting the communication,
    wherein the network identifier represents a set of X, Y coordinates associated with a respective one of a plurality of cells of a grid into which the region is divided and in which the static node is located, each of the plurality of cells having a defined size, the X, Y coordinates provided without deviating from the standard protocol, wherein the assigned network identifier is included in a message transmitted in accordance with the standard protocol.

9. The static node according to claim 8, wherein the transceiver is configured to periodically broadcast the network identifier to receiving nodes.

10. The static node according to claim 9, wherein the transceiver is coupled to the receiving nodes through an air interface and, when the network identifier is periodically broadcast, the receiving nodes receive the network identifier and estimate a one of the plurality of cells of the grid within which respective ones thereof are located based on the network identifier and additional parameter received from the static node.

11. The static node according to claim 10, wherein the additional parameter includes a received signal strength indication (RSSI).

12. The static node according to claim 9, wherein the transceiver is coupled to a concentrator node, the concentrator node coupled to a public network, and, when the network identifier is periodically broadcast, the concentrator node collects information about the position of the static node based on the network identifier and transfers transferring the collected information from the concentrator node to a destination via the public network.

13. The static node according to claim 12, wherein the information includes alarm information associated with one of: the static node; and ones of the receiving nodes, the information collected and transferred via the public network using an application layer.

14. The static node according to claim 8, wherein the standard protocol for the short range wireless network includes an 802.15.4 protocol.

15. A mobile node capable of establishing a zone position in a region serviced by a short range wireless network, the mobile node comprising:
    a transceiver for transmitting and receiving communications according to a standard protocol for the short range wireless network; and
    a processor coupled to the transceiver, the processor configured to receive from the transceiver a network identifier in accordance with the standard protocol from at least one of a plurality of static nodes within the short range wireless network, the network identifier identifying the at least one of the plurality of static nodes,
    wherein the network identifier represents a set of X, Y coordinates associated with a respective one of a plurality of zones of a grid into which the region is divided and in which the at least one of the plurality of static nodes is located, each of the plurality of zones having a defined size, the X, Y coordinates provided without deviating from the standard protocol, wherein the assigned network identifier is included in a message transmitted in accordance with the standard protocol.

16. The mobile node according to claim 15, wherein the transceiver is configured to periodically receive the network identifier from the at least one of the plurality of static nodes as it moves within the region serviced by the short range wireless network.

17. The mobile node according to claim 15, wherein the transceiver is coupled to the plurality of static nodes through an air interface and, when the network identifier is periodically received from the at least one of the plurality of static nodes, the processor is further configured to estimate a one of the plurality of zones of the grid within which the mobile node is located based on the network identifier and an additional parameter received from the at least one of the plurality of static nodes.

18. The mobile node according to claim 17, wherein the additional parameter includes a received signal strength indication (RSSI).

19. The mobile node according to claim 17, wherein the standard protocol for the short range wireless network includes an 802.15.4 protocol.

20. A non-transitory computer-readable medium for establishing positions in a region serviced by a short range wireless network, the region defined by a grid divided into a plurality of cells having a predetermined size, a plurality of static nodes associated with the short range wireless network capable of being placed within ones of the plurality of cells, the computer readable medium comprising instructions stored thereon, the instructions when read and executed by a processor in one of the plurality of static nodes for causing the one to:
    periodically broadcast a positioning communication; and
    include a network identifier in accordance with a standard protocol of the short range wireless network when transmitting the positioning communication, the network identifier identifying a node from which the communication is transmitted,
    wherein the network identifier is specifically configured to represent a set of X, Y coordinates associated with a respective one of the plurality of cells of the grid into which the region is divided, each of the plurality of cells having a defined size, the X, Y coordinates provided without deviating from the standard protocol, wherein the assigned network identifier is included in a message transmitted in accordance with the standard protocol.

21. The non-transitory computer-readable medium according to claim 20, wherein the standard protocol for the short range wireless network includes an 802.15.4 protocol.

22. An apparatus for establishing positions in a region serviced by a short range wireless network, the apparatus comprising:
    means for transmitting and receiving communications according to a standard protocol for the short range wireless network; and
    means for including a network identifier in accordance with the standard protocol when transmitting the communications, the network identifier identifying a node from which the communications are transmitted,
    wherein the network identifier represents a set of X, Y coordinates associated with a respective one of a plurality of cells of a grid into which the region is divided and in which the node is located, each of the plurality of cells having a defined size, the X, Y coordinates provided without deviating from the standard protocol, wherein the network identifier is included in a message transmitted in accordance with the standard protocol.

23. The apparatus according to claim 22, wherein the means for transmitting and receiving is further for periodically broadcasting the network identifier to receiving nodes over an air interface.

24. The apparatus according to claim 23, wherein the means for transmitting and receiving further transmits an additional parameter with the network identifier.

25. The apparatus according to claim 24, wherein the additional parameter includes a received signal strength indication (RSSI).

26. The apparatus according to claim 22, wherein the standard protocol for the short range wireless network includes an 802.15.4 protocol.

* * * * *